United States Patent [19]

Kobayashi et al.

[11] 3,894,873

[45] July 15, 1975

[54] DRY PLANOGRAPHIC PRINTING PLATE

[75] Inventors: Masaharu Kobayashi; Masao Iwamoto, both of Otsu, Japan

[73] Assignee: Toray Industries, Inc., Tokyo, Japan

[22] Filed: Mar. 21, 1973

[21] Appl. No.: 343,464

[52] U.S. Cl. .......................... 96/33; 96/85; 96/86 P; 96/87 R

[51] Int. Cl. .......................... G03f 7/02

[58] Field of Search ............ 96/33, 115 P, 85, 86 P, 96/87 R

[56] References Cited

UNITED STATES PATENTS

| | | | |
|---|---|---|---|
| 2,714,066 | 7/1955 | Jewett et al. | 96/33 |
| 2,760,863 | 8/1956 | Plambeck | 96/115 P |
| 2,951,758 | 9/1960 | Notley | 96/115 P |
| 3,511,178 | 5/1970 | Curtin | 96/33 |

*Primary Examiner*—David Klein

[57] ABSTRACT

Presensitized planographic printing plate for use in dry planography. A positive acting plate having a flexible base and a relatively thick (0.02 to 2.00 mil) silicone rubber layer, overlying a photo-polymerizable and photoadhesive-layer. Upon exposure to light through a positive transparency, the photoadhesive layer in the exposed non-image area polymerizes and adheres firmly to the thick silicone rubber overlayer, but the photoadhesive layer in the unexposed image area remains non-adhesive to the silicone overlayer. Following the exposure, the surface of the plate is treated with developing liquid capable of swelling silicone rubber. The thick silicone rubber layer in the unexposed image area is easily removed, exposing a sharp image of oleophilic photoadhesive layer underlying the removed silicone layer, while the silicone rubber layer in the exposed background area remains bound to the photoadhesive underlayer. The exposed surface of the photoadhesive layer accepts ink from inking rollers, while the silicone rubber background area does not remove ink from the rollers, and thus remains ink-free.

9 Claims, 4 Drawing Figures

DRY PLANOGRAPHIC PRINTING PLATE

BACKGROUND OF THE INVENTION

This invention relates to dry planography in which there is used a planographic plate having background or non-imaged surface areas consisting of elastic silicone rubber that, although not moistened by water or other liquid, will not accept ink from a rotating inking roller passed thereover. In particular, it relates to a new method of making a presensitized planographic printing plate for use in dry planography.

New planographic plates have heretofore been developed which do not require the use of a fountain solution to prevent the non-imaged area from picking up ink (toning) while running on the press. See, for example, U.S. Pat. Nos. to Curtin, 3,511,178; Gipe, 3,632,375; and Gipe, 3,677,178.

One of the plates described in Curtin, U.S. Pat. No. 3,511,178, and in Gipe, U.S. Pat. No. 3,677,178, is a presensitized plate having a layer of photo-insolubilizable water-soluble diazonium salt beneath the layer of silicone rubber. When that plate is exposed to light through a positive transparency, the diazonium compound in the exposed background area is photo-insolubilized while the diazonium salt in the unexposed image area remains water soluble.

Following exposure, the surface of the plate is treated with aqueous developing liquid which penetrates the silicone layer and dissolves the water-soluble diazonium compound in the image area thereby allowing the overlying silicon rubber to come away, exposing the oleophilic surface of the presensitized plate in the imaged area. The exposed surface of the presensitized plate then accepts ink from the inking rollers, while the silicone rubber background area does not remove ink from the rollers, and thus remains ink-free.

The resulting plate is capable of printing thousands of copies. Since the silicone rubber layer applied to this plate is required to be thin enough to allow it to be removed easily with the aqueous developing liquid, the silicone rubber surface tends to be harmed by scratching while handling and mounting on the press, so the resulting plate may cause toning in the background area if used for printing ten thousands of copies.

If the silicone rubber layer is thick, the resulting plate will show adequate durability. However, it becomes difficult to remove the silicone layer in the image area, so the resulting plate may give only poor image fidelity.

Another one of the plates described in Curtin, U.S. Pat. No. 3,511,178, is a presensitized plate having a layer of photo-solubilizable water-insoluble diazonium salt beneath the silicone rubber layer. Upon exposure to light through a negative transparency, the diazo compound in the exposed image area is solubilized while the diazonium salt in the unexposed background area remains water-insoluble. Following exposure, the surface of the plate is treated with an aqueous liquid which penetrates the silicone rubber layer, and dissolves the water-solubilized diazo-compound in the image area, thereby allowing the overlying silicone rubber layer to come away, exposing the oleophilic surface of the presensitized plate in the image area.

The plate thus prepared is capable of printing without requiring dampening. However, since the silicone layer overlies the photo-responsive layer and the plate is developed with an aqueous liquid, this plate has the same defects as the plate of the previous example.

Another one of the plates described in Gipe, U.S. Pat. No. 3,632,375 and U.S. Pat. No. 3,677,178, is a presensitized plate having a layer of photo-insolubilizable water-soluble diazonium salt over a layer of silicone rubber. In order to ensure the adherence of the photo-responsive layer to the silicone layer, a layer of polymeric anchoring comprised of finely divided polymer particles or a polymeric film is applied to the surface of the silicone while the silicone is uncured and adhesive.

Upon exposure to light through a negative transparency, the diazonium salt in the exposed image area is insolubilized while the diazonium salt in the unexposed non-image area remains water-soluble. Following exposure, the surface of the plate is developed with an aqueous liquid which dissolves the water-soluble diazo-salt in the non-image area. Thus, the developed plate is comprised of the photo-insolubilized layer, which is the ink-receptive image area, and the exposed surface of the silicone rubber layer, which is the ink-repellent non-image area. The resulting plate is capable of printing thousands of copies. However, the photo-insolubilized image layer is consequently picked up by the inking roller and dissappears from the plate surface during the printing of ten thousands of copies, and the resulting copies do not print satisfactorily.

As described above, the silicone rubber layer must be applied over the photo-responsive layer for improved bonding between the layers. The silicone rubber layer should also be thick to provide for high scratch resistance of the silicone surface.

All of the plates so far developed fail to satisfy all desired requirements.

The object of the new dry planography based upon this invention is to solve these problems and to provide an ideal plate having remarkable processability, good image fidelity, and high durability in long-run printing.

SUMMARY OF THE INVENTION

The presensitized plate based upon the new planography in this invention is a positive acting plate having a flexible base, a relatively thick silicone rubber layer having a thickness of from 0.02 to 2.0 mil, (preferably from 0.04 to 1.00 mil) overlying a photo-polymerizable and photoadhesive-layer. Upon exposure to light through a positive transparency, the photoadhesive layer in the exposed non-image area polymerizes and adheres (or binds) firmly to the silicone rubber overlayer, but the photoadhesive layer in the unexposed image area remains non-adhesive (or non-binding) to the silicone overlayer.

Following exposure, the surface of the plate is treated with a developing liquid which is capable of swelling the silicone rubber. Though the silicone rubber layer of this plate is very thick, the silicone layer in the unexposed image area is easily removed, exposing a sharp image of oleophilic surface of the photoadhesive layer underlying the removed silicone layer, while the silicone rubber layer in the exposed background area remains bound to the photoadhesive underlayer. The exposed surface of the photoadhesive layer accepts ink from the inking rollers, while the silicone rubber background area does not remove ink from the rollers, and thus remains ink-free.

Since the resulting plate has a thick layer of silicone rubber which is firmly bound to the photopolymerized underlayer in the non-imaged background area, this plate has high scratch resistance and is capable of printing more than one hundred thousand clean copies in the absence of dampening.

The flexible base substrate employed in the present invention should be sufficiently flexible that it can be mounted on a lithographic press and strong enough that it can withstand the stresses normally produced by the lithographic process. It is useful to apply a coating to prevent halation from the base surface. Representative substrates include coated papers, metals, or plastics such as polyethylene terephthalate. While aluminum appears to be the preferred metal substrate on the basis of cost, handling properties, and the like, sheets of lithographic zinc, and foils of copper, and steel and all can be employed as flexible substrates in the present invention.

The photoadhesive layer employed in the present invention polymerizes and firmly binds the overlying silicone rubber layer when exposed to actinic radiation. The photoadhesive layer can be of any desired thickness as long as the layer is coherent, continuous and securely bonded to the base. If necessary, bonding may be through an anchor coat layer. Sometimes such an anchor coat may also be effective to prevent halation from the base surface. The thickness of the photoadhesive layer is preferred to be less than 4 mil. A layer thinner than 2 mil may be more useful.

The photoadhesive layer in this invention comprises 1.0 – 99.9 parts by weight of an ethylenically unsaturated photopolymerizable monomer or oligomer having a boiling point above 100°C, 0.1 – 20.0 parts by weight of a photoinitiator, and, if necessary, 0.0 – 1.0 part by weight of an inhibitor of heat polymerization, 0.0 – 95.0 parts by weight of a polymeric material or an inorganic powder, for maintenance of the form of the photoadhesive layer.

Representative examples of the photopolymerizable monomer or oligomer include unsaturated acrylic or methacrylic monomers or oligomers having a boiling point above 100°C which are derived from monoalcohols or monoamines having less than 30 carbon atoms or polyalcohols or polyamines having less than 80 carbon atoms.

Following are representative monomers which are effective in this invention, some of which can be the raw materials of effective oligomers:

1. Acrylic or methacrylic esters of the following alcohols: methanol, ethanol, propanol, butanol, pentanol, cyclohexanol, octanol, undecanol, bornyl alcohol, polymethylene glycols, ethylene glycol, polyethylene glycols, propylene glycol, polypropylene glycols, glycerol, trimethylolmethane, pentaerythritol, etc. Other examples include glycidyl methacrylate and its addition products with hydrogen halide, amines, carboxylic acids and itself, etc., such as

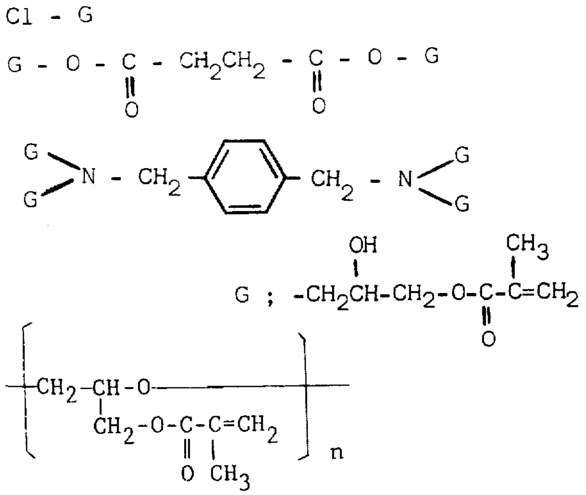

2. Acrylamide or methacrylamide derivatives such as (metha) crylamide, N-methylol (metha)crylamide, N-methoxymethyl (metha)crylamide, methylene-bis-(metha)crylamide, hexamethylene-bis-(metha)crylamide, Diacetone acrylamide Hydroxymethyldiacetone acrylamide.

The most useful examples of monomers which can be applied in the photoadhesive layer are (poly)ethyleneglycol dimethacrylate

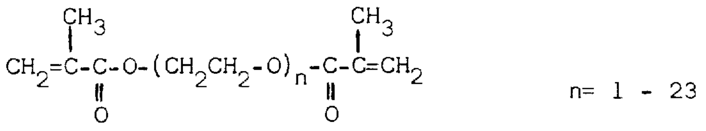

3-chloro-2-hydroxypropyl methacrylate

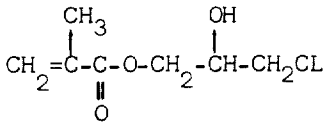

dimethylaminoethyl methacrylate

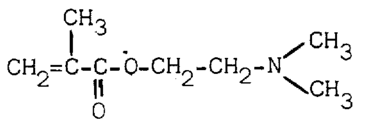

N,N,N',N'-tetrakis-2-hydroxy-3-methacryloyloxypropyl-xylylenediamine

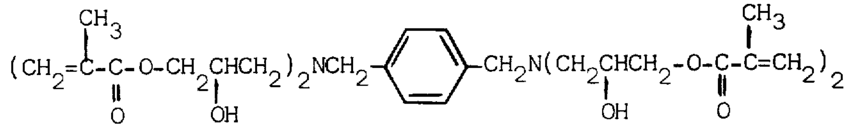

N-methoxymethylacrylamide

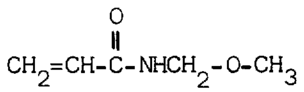

2-(2-methyl-3-hydroxymethyl-4-oxo-6-hydroxyhexyl) acrylamide

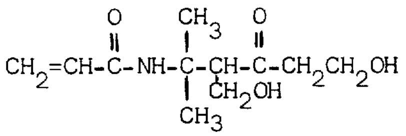

Representative examples of the photoinitiator include well known photoinitiators of the following groups as shown in the text book "Light Sensitive Systems" by J. Kosar (Wiley, 1965):

1. benzophenone derivatives such as benzophenone, 4,4'-dimethylaminobenzophenone (Michler's ketone), xanthone, anthrone, etc.
2. benzoin derivatives such as benzoin, benzoin methyl ether, benzoin isopropyl ether, etc.
3. quinones such as p-benzoquinone, $\beta$-naphthoquinone, $\beta$-methylanthraquinone, etc.
4. organic sulfur compounds such as dibenzyl disulfide, di-n-butyl disulfide, etc.
5. azo or diazo compounds such as 2-azo-bis-isobutyronitrile, 1-azo-bis-1-cyclohexanecarbonitrile, p-diazobenzylethylaniline, Congo Red, etc.
6. halogen compounds such as carbon tetrabromide, silver bromide, $\alpha$-chloromethyl-naphtharene, etc.
7. peroxides such as dibenzoyl peroxide, etc.
8. nitrates such as uranyl nitrate, etc.
9. organic dyes such as riboflavin, etc.

In order to obtain practical photosensitivity and processable miscibility with other components, the photoinitiators useful in this invention can be chosen from the representatives shown above in accordance with the spectrum of the light source used upon exposure and the properties of the monomer or oligomer applied in the photoadhesive layer.

If such requirements are satisfied, the following initiators are most useful in this invention:

benzophenone, benzoin methyl ether, xanthone, dibenzyl disulfide, uranyl nitrate.

The photopolymerizable monomer or oligomer and the photoinitiator which are described above form the unomittable components in the photoadhesive layer in the present invention.

In addition to those, if necessary, very small amount of (some ppm) heat polymerization inhibitor is preferably added to the photoadhesive composition, in order to maintain photosensitivity of the presensitized plate and prolong the storable period. Representative examples of such inhibitors are hydroquinone, phenothiazine, 2,4-dinitrophenol, triphenylmethane, etc.

Furthermore, if necessary, other additives are preferably included in the photoadhesive layer to make the said layer solid enough to support the silicone rubber overlayer horizontally parallel with the base layer, and also to improve the bonding to the overlying silicone rubber layer. The resulting plate will show a high scratch resistance and excellent storability. Representative examples of such additives include fine powders of inorganic substance and polymeric materials.

The useful inorganic powders are those which can disperse in the photoadhesive composition. The representative examples of such inorganic powders are colloidal silica, calcium carbonate, magnesium carbonate, ferricoxide etc.

Useful polymeric materials are those which can be mixed with other components homogeneously.

According to methods of applying the photoadhesive composition on to the base surface, various properties of the useful polymeric materials will be required.

When the components are dissolved and mixed in the solvent, the polymeric materials should be soluble.

When the polymeric materials are melted and the other components are mixed with the melted polymer, the polymeric materials should melt at the low temperature at which the monomer or oligomer will not polymerize on account of heat.

Thus, the polymeric materials useful in the present invention should be soluble or its flow temperature should be lower than 150°C.

If these requirements are satisfied, the following examples of polymeric materials or copolymers can be used:

1. Vinyl polymers such as polyvinyl acetate, polyvinyl alcohol, polyvinyl butyral, polyvinyl butyl ether, polyvinyl chloride, polyethylene or copolymers, etc.
2. (Meth)acrylic polymers such as polybutyl (meth)acrylate, polyoctyl (meth)acrylate, or copolymers, etc.
3. Gums which are not vulcanized yet, such as natural gum, polybutadiene, polyisobutylene, polychloroprene, polyneoprene or copolymers, etc.
4. Polyethers such as polyethylene oxide, polypropylene oxide, etc.
5. Polyamide such as copolymer of the following monomers: caprolactam, laurolactam, hexamethylene diamine, 4,4'-diaminocyclohexylmethane, 2,4,4'-trimethyl hexamethylene diamine, isophoronediamine, diglycolic acid, isophthalic acid, adipic acid, etc.
6. Polyesters such as the condensates of phthalic anhydride, maleic anhydride, bis-phenol A and propylene oxide, etc.
7. Cellulose derivatives such as methylcellulose, acetylcellulose, nitrocellulose, etc.
8. Prepolymers of epoxy, urea, alkyd, melamine and phenol resins, etc.
9. Other examples may include gum rosin, polyterpenes, cumarone-idene resin, etc.

The silicone rubber employed in this invention is a diorganopolysiloxane composition which upon curing to a solid elastic state provides an ink repellent surface while printing on the press.

Silicone rubbers suitable for use in the present invention are well known. Essentially, they are elastomers of high-molecular weight, about 400,000 to 800,000, formed by slightly crosslinking linear diorganopolysiloxanes (preferably dimethylsiloxane) which are stopped by acyloxy, hydroxy or oxime radicals. The crosslinking is usually the result of action by metal carboxylates and heat, if necessary, or moisture.

These silicone rubbers are commonly referred to as "silicone elastomers" and are formed by the cure or further polymerization of "silicone gums."

Silicone elastomers, formed by further polymerizing the gums, can be characterized generally as the very sparely cross-linked (cured) dimethyl polysiloxane of high-molecular weight. The sparsity of crosslinking is indicated by R/Si ratios very close to 2, generally above 1.95, or even above 1.99, and generally below 2.1 or even below 2.01, there usually being 200 – 500 dimethyl units between cross-link sites in contrast to the much more densely cross-linked silicone resins which are considered commercially useful and which fall in the range of R/Si ratios of 1.2 – 1.5

Representative silicone gums include the diorganopolysiloxanes having the central repeating linear

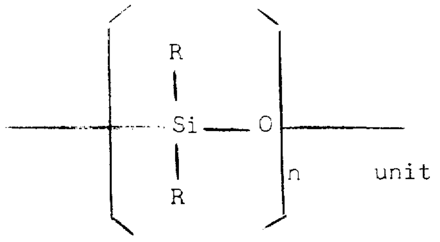

where $n$ may be as small as 2 or as large as 20,000 or more, and where the R moieties in the chain may be the same, but need not be each individual R being a group selected from the class consisting of hydrogen, vinyl, alkyl, aryl, halogenated vinyl, halogenated alkyl, halogenated aryl, and cyano alkyl, wherein more than 60% of said R groups are preferably methyl groups.

While an internal R may become a crosslinking site, depending somewhat on the curing mechanism, for example, in the case of R being H, crosslinking more frequently involves the end groups which may be

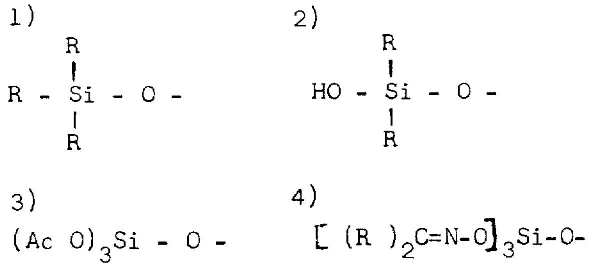

where "R" has the same meaning as above, and where Ac is a saturated aliphatic monoacyl radical having 1 to 18 carbon atoms.

The polymerizable silicone gums preferably are compounded with a catalyst to promote cure. The catalysts employed in the silicone rubber compositions include the organic carboxylic acid salts of tin, zinc and other multivalent metals and are well known in the art.

Commercially available unpigmented silicon gum compounds generally provide, after curing, satisfactory silicone rubber layere which adhere to the photoadhesive layer when exposed to light and provide good mechanical properties which minimize problems of wear, both in physical handling and under the abrasive conditions on the press.

In addition to the catalyst, other materials are often compounded with the silicone gums. For example, fillers such as the silica fillers can be employed to improve the mechanical properties of the cured silicone rubber.

The major portions of the presensitized plate in the present invention are the base, the photo-adhesive layer, the silicone rubber layer, as explained above.

In addition to those unomittable portions, a thin transparent protecting film overlying the silicon rubber surface is preferably applied to the presensitized plate.

Such a transparent film may preferably be thinner than 10.0 mils (preferably thinner than 4.0 mils) to obtain good image fidelity.

Representative examples of such a transparent film include following:

polyethylene, polypropylene, polyvinyl chloride,
polyvinyl acetate, polyvinyl alcohol, polystyrene,
polyethylene terephthalate, polycarbonate,
cellulose triacetate, etc.

The light sources employed in the exposure process in this invention are those which furnish an effective amount of the radiation in the ultraviolet range in which the photopolymerization initiators or catalysts generally exhibit their maximum sensitivity.

Such light souces include carbon arcs, mercury lamps, fluorescent lamps with special ultraviolet light emitting phosphors, argon glow lamps and photographic flood lamps.

Of these, the mercury lamps of high vapor pressure are customarily used at a distance of 2 to 4 feet from the presensitized plate surface.

On the other hand, with a more uniform by extended source of low intrinsic brilliance, such as a group of contiguous fluorescent lamps with special phosphors, the plate can be exposed at a distance of 1 foot or less from the lamps.

DETAILED DESCRIPTION OF PREFERRED EMBODIMENTS

The new planographic printing plate of the present invention and the method of producing said plate will be explained by reference to FIGS. 1–4.

Figure 1:
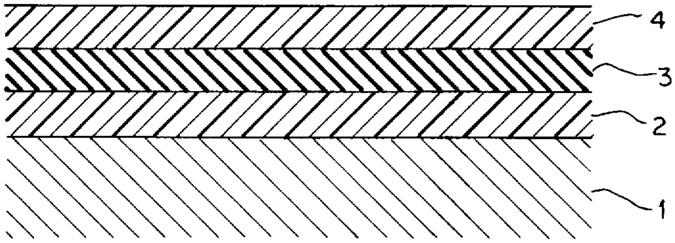
FIG. 1 represents a schematic view, in section, of a new presensitized planographic plate according to the present invention.

Referring first to FIG. 1, a layer of photoadhesive composition 2 is applied to a flexible substrate 1 by known coating apparatus, such as a reverse roll coater, blade coater, Mayer bar, knife, etc.

A silicone gum composition is applied over the photoadhesive layer 2 by coating a silicone solution or by transferring a silicone film previously prepared over a releasable substrate. Then the silicone layer is cured to provide an elastic silicone rubber layer 3.

When the silicone solution is coated over the photoadhesive layer 2, the solvents of the solution should not damage the photoadhesive layer. The silicone layer 3 is required to provide the boundary parallel to the silicone surface.

The surface of the silicone rubber layer 3 thus applied may be somewhat tacky which makes multiple burning or step-and-repeat exposure and surface cleaning difficult.

To prevent sticking of positives to the plate surface and facilitate easy movement of the positives, a thin transparent protecting film 4 may preferably be applied on the silicone rubber surface 3 by known laminater, which may also prevent the diffustion of atomospheric oxygen into the photoadhesive layer 2 and accelerate the photopolymerization of the photoadhesive layer.

The plate without a protecting film may preferably be stored in the atmosphere of inert gases like nitrogen or carbon dioxide to substitute oxygen usually abosrbed in the photoadhesive layer. However, exposure through a protecting film 4 will be more convenient in plate handling.

Figure 2:
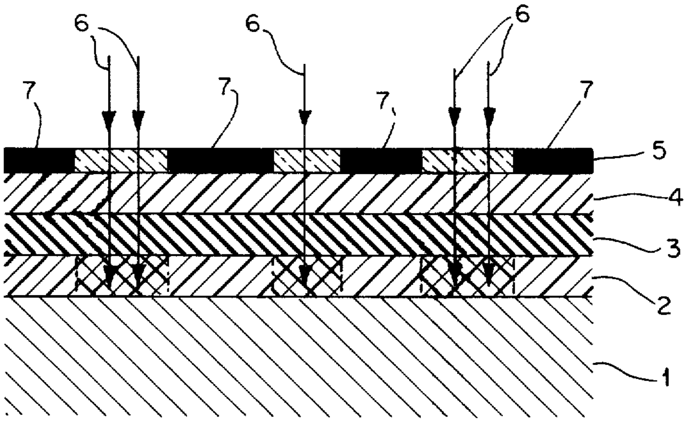
FIG. 2 schematically depicts the exposure of the new planographic plate of the invention to light through a positive transparency.

As illustrated in FIG. 2, the plate thus prepared is exposed to actinic light through a positive transparency 5, where, in FIG. 2, the arrowed lines 6 represent light rays and the image areas are identified by the reference numeral 7.

The areas of the photoadhesive layer 2 which are exposed to light polymerizes and binds the silicone rubber overlayer.

Following the exposure, the protecting film 4 is removed, if necessary, and the plate surface is soaked in the developing liquid which is absorbed by the silicone rubber layer 3 and swells the said rubber layer. The silicone layer in the unexposed image areas, identifed as 3' in FIG. 3, becomes crumpled or like a wash board, as it is swelled more than the exposed background area identified as 3''.

Then the silicone rubber surface is swabbed with a cotton cloth or a cotton padding until the swollen crumpled portions 3' of the silicone rubber layer are swabbed up, exposing therebeneath the surface portions 2' of the unhardened photoadhesive layer.

Figure 3:
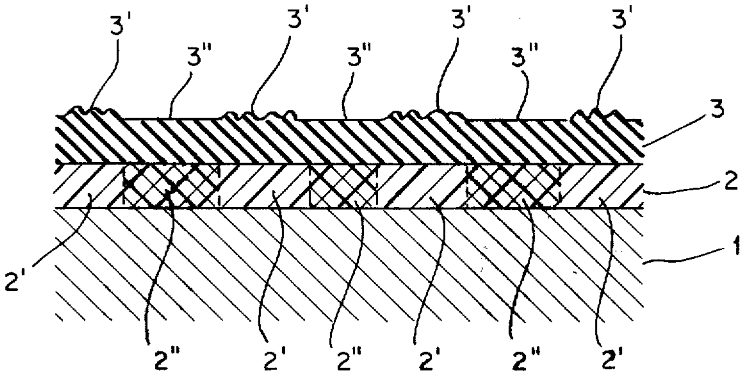
FIG. 3 shows schematically the plate soaked in the developing liquid.

The portions 3'' of the silicone rubber layer in the non-image area remain bound firmly by the hardened photoadhesive underlayer, identified as 2'' in FIG. 3, and hence these portions 3'' are not practically affected by the swabbing with the developing liquid, and remain over the photoadhesive layer portions 2''.

Figure 4:
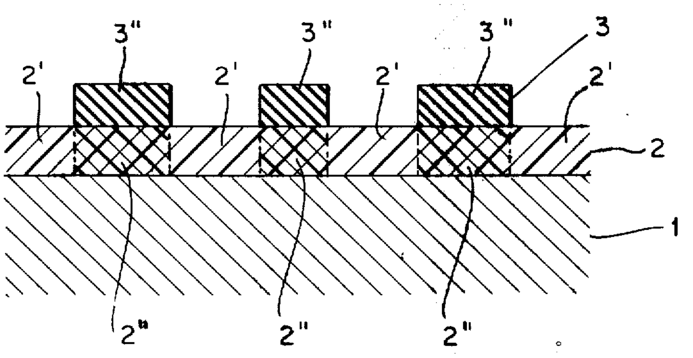
FIG. 4 represents schematically a sectional view of the developed plate.

Following development, the plate is dried to be ready for use, as is represented in FIG. 4.

In addition to the procedure described above, the plate thus prepared may be exposed to actinic light or heated afterward, if necessary, to complete the bonding to the silicone rubber layer 3'' in the background area, which will improve the scratch resistance of the plate surface and durability throughout the long-run-printing.

The developing liquids useful in this development procedure are those which can be absorbed by the cured silicone rubber and swell the said layer without affecting or weakening the bonding of the photoadhesive layer to the silicone rubber layer in the light-exposed background area.

The most useful developing liquids include paraffin or linear hydrocarbon, or a mixture having those as major components. Such liquids are commercially and economically available from the fractional distillation products of petroleum, such as:

| | | |
|---|---|---|
| gasoline | ( bp 40° - 200°C | $C_4$ - $C_{11}$ fraction ) |
| kerosene | ( bp 180° - 300°C | $C_{11}$ -$C_{16}$ fraction ) |
| light oil | ( bp 200° - 320°C | $C_{12}$ - $C_{16}$ fraction ) |
| heavy oil | ( bp>300°C | $C_{16}$ - $C_{30}$ fraction ) |

Of these, the fractions having the lower boiling point (bp) are more absorbed by the silicone rubber, which is more swollen and consequently can be removed more easily than those treated by the fraction of higher boiling point. Thus, gasoline is one of the most useful, convenient and economical developing liquids.

As to the use of gasoline or kerosene, which are attractive in that they have the lower boiling points, such liquids are usually used in printing factories for cleaning up the printing inks, so there may be no objection to the use of gasoline or kerosene for the developing liquid.

These hydrocarbons do not usually affect and dissolve even the unhardened photoadhesive layer, to say nothing of the photopolymerized background area. Thus, the unhardened photoadhesive layer 2' remains on the plate surface after the removal of the silicone rubber layer 3' in the image area.

In the plate of this invention, the plate surface has less ups and downs by the thickness of the photoadhesive layer than the plate exposing the base surface in the image area, and the photoadhesive layer 2' remaining in the image area will turn to the more ink receptive area through aftercuring by the light exposure or heating.

Besides those hydrocarbon fractions, the more refined hydrocarbons such as pentane, hexane, heptane, octane, etc., or benzene, toluene, xylene etc., and silicones such as diorgano (poly) siloxanes are, of course, useful developing liquids.

In addition to these hydrocarbons, the hydrocarbon derivatives such as halogenated hydrocarbon, alcohols, ketones, carboxylic acids, or esters, can be used as minor portions, preferably less than 50% by weight if possible any ratio of the developing liquid may be used which has ability to swell the resulting silicone rubber.

Such developing liquids as shown above can be applied by themselves or being emulsified with suitable surfactants.

Presented next are lists of symbols or monomers, polymer binders, and photoinitiators used in the examples which follow the symbol lists.

| Symbols | Monomers used in the photoadhesive layer | Molecular formulae |
|---|---|---|
| M - 1 | hydroxyethyl methacrylate | $CH_2=C(CH_3)-C(=O)-O-CH_2CH_2OH$ |
| M - 2 | (poly)ethylene glycol dimethacrylate | $CH_2=C(CH_3)-C(=O)-[O-CH_2CH_2]_n-O-C(=O)-C(CH_3)=CH_2$   n=1~23 |

| Symbols | Monomers used in the photoadhesive layer | Molecular formulas |
|---|---|---|
| M - 3 | dimethylaminoethyl methacrylate | $CH_2=C(CH_3)-C(=O)-O-CH_2CH_2N(CH_3)_2$ |
| M - 4 | dimethyl 2-methacryloyloxypropyl phosphonate | $CH_2=C(CH_3)-C(=O)-O-CH(CH_3)-CH_2OP(=O)(OCH_3)_2$ |
| M - 5 | 3-chloro-2-hydroxypropyl methacrylate | $CH_2=C(CH_3)-C(=O)-O-CH_2-CH(OH)-CH_2Cl$ |
| M - 6 | addition product of glycidyl methacrylate / xylylene diamine ( 4 / 1 mole ratio ) | 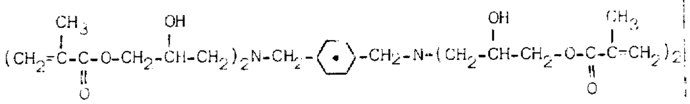 |
| M - 7 | acrylamide | $CH_2=CH-C(=O)-NH_2$ |
| M - 8 | N-methylolacrylamide | $CH_2=CH-C(=O)-NHCH_2OH$ |
| M- 9 | N-methoxymethyl acrylamide | $CH_2=CH-C(=O)-NHCH_2OCH_3$ |
| M- 10 | diacetoneacrylamide | $CH_2=CH-C(=O)-NH-C(CH_3)_2-CH_2-C(=O)-CH_3$ |
| M- 11 | hydroxymethyldiacetoneacrylamide | $CH_2=CH-C(=O)-NH-C(CH_3)_2-CH(CH_2OH)-C(=O)-CH_2-CH_2OH$ |
| M- 12 | isoprene dimer | 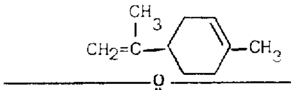 |
| M- 13 | diallyl phthalate | 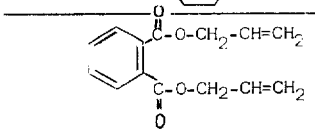 |
| M- 14 | triallyl cyanurate | 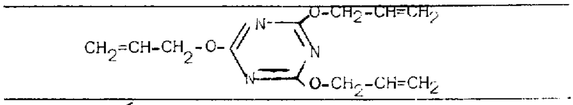 |
| M- 15 | polyvynyl cinnamate | 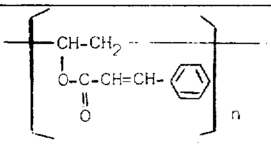 |
| P - 1 | Daicel Ltd. " Sebian A 831 " | acrylic copolymer |
| P - 2 | Nippon Gosei Kagaku Ltd. " Koponyl PD 40T " | acrylic copolymer |

| Symbols | Polymer binders used in the photoadhesive layer | Groups of the polymer binder |
|---|---|---|
| P - 3 | Nippon Gosei Kagaku Ltd. " Goponyl E 50 ( Y8 ) " | polyvinyl acetate Pn ≈ 1400 |
| P - 4 | Sekisui Kagaku Ltd. " Esdain 380 " | vinly chloride copolymer |
| P - 5 | Denki Kagaku Ltd. " Denkalac 31 " | vinyl chloride - vinyl acetate copolymer |
| P - 6 | Nippon Gosei Kagaku Ltd. " Soalex S 4301 " | ethylene - vinyl acetate copolymer |
| P - 7 | Sekisui Kagaku Ltd. " Esdain 285 " | chloroprene copolymer |
| P - 8 | laboratory product | polystyrene |
| P - 9 | Toray Ind. Ltd. " Torex G - 1 " | polymethyl methacrylate Pn ≑ 800 |
| P - 10 | Denki Kagaku Ltd. " PEO - 3 " | polyethylene oxide Mw ≈ 500,000 ~ 700,000 |
| P - 11 | Dainippon Ink Kagaku Ltd. " Polylite TDR 1131 R " | unsaturated polyester resin ( solid part ) ( bis-phenol A / propylene oxide / maleic anhydride ) |
| P - 12 | laboratory product | soluble nylon copolymer ( 6 / 66 / IPD* . DGA** ) ( 40/35/25 Wt.% ) |
| P - 13 | Shinetsu Kagaku Ltd. " Metholose 65 SH 2 | methyl hydroxypropyl cellulose |

* isophoronediamine
** diglycolic acid

| Symbols | Photoinitiators used in the photoadhesive layers | Molecular formulas |
|---|---|---|
| IN - 1 | benzophenone | 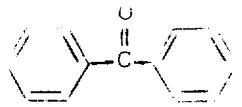 |
| IN - 2 | xanthone | 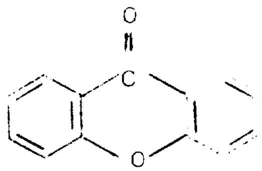 |
| IN - 3 | Michler's ketone | 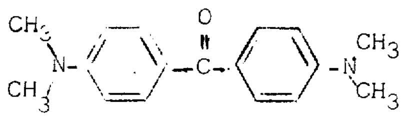 |

| Symbols | Photoinitiators used in the photoadhesive layers | Molecular formula |
|---|---|---|
| IN - 4 | p - quinone |  |
| IN - 5 | β - naphthoquinone | 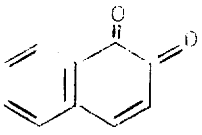 |
| IN - 6 | - methylanthraquinone | 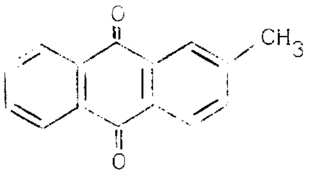 |
| IN - 7 | benzoin | 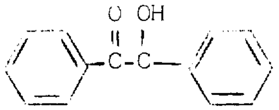 |
| IN - 8 | benzoin methyl ether | 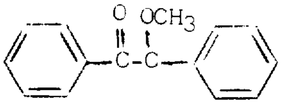 |
| IN - 9 | dibenzyl disulfide | 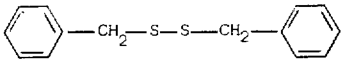 |
| IN - 10 | carbon tetrabromide | $CBr_4$ |
| IN - 11 | uranyl nitrate | $UO_2(NO_3)_2$ |
| IN - 12 | azo-bis-isobutyronitril | 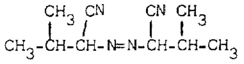 |
| IN - 13 | Congo Red | 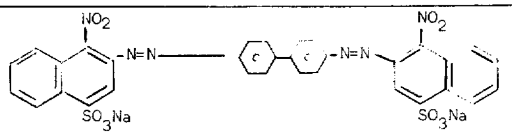 |
| IN - 14 | riboflavin | 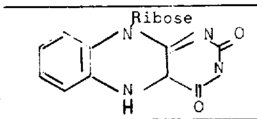 |
| IN - 15 | benzoyl peroxide | 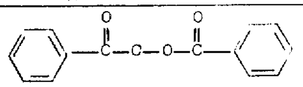 |

EXAMPLES

EXAMPLE 1

A sand blasted aluminum plate is coated with a 0.5 mil photoadhesive layer comprising:

| | |
|---|---|
| (a) monomer | 95 weight % |
| (b) benzoin methyl ether | 5 weight % |

An abhesive coating solution is prepared by dissolving "Toshiba Silicone YE-3085" (an uncured, filled, single component silicone gum of linear diorganopolysiloxane having acetoxy endgroups at which crosslinking can be produced by the action of atmospheric moisture through emitting acetic acid) in n-heptane at room temperature to yield approximately 7.5 % solution by weight.

The surface of the photoadhesive layer is overcoated with the silicone gum solution, to provide a 0.2 mils cured silicone rubber layer after drying and being stored in moderate humidity for 24 hours at room temperature.

Over the silicone rubber surface thus applied, a 0.2 mil polyethylene terephthalate film (Toray "Lumirror") is laminated by calendering rollers.

The plate thus prepared is exposed through a positive transparency for a suitable number of minutes to a fluorescent lamp (Mitsubishi Electric, FL 20S-BL-360) at a distance of 4 inches.

Following the exposure the protecting film is peeled and the surface of the exposed plate is soaked in n-heptane developer for 10 seconds.

When the exposure time is adequate, the silicone rubber layer in the unexposed image area exhibits swollen crumpled visible image in the surface. On the other hand, there appears no change in the silicone rubber layer in the background area except a small extent of silicone swelling.

Then the plate surface is swabbed with a soft cotton padding while the surface is wet, until the crumpled silicone rubber layer in the image area is completely removed.

Thereafter, the plate is dried, mounted on a rotary offset duplicator ("Multilith 1250" Addressograph Multigraph Co.) from which the molleton rollers (water fountain rollers) have been removed. The plate is inked with "Driocolor-black" Dainippon Ink Kagaku Ltd. by the inking rollers and resulting copies are examined.

The results are all summarized in Table 1 below, where the adequate exposure times are shown for each plate having various compositions of the photoadhesive layer. These adequate exposure times mean the exposure time to obtain a plate having image fidelity and capability of printing more than 10,000 copies after the development.

Table 1

| Experiment Numbers | Monomers | Adequate Exposure Times (min.) |
|---|---|---|
| 1 | M - 2 | 30 |
| 2 | M - 4 | 30 |
| 3 | M - 6 | 0.5 |
| 4 | M - 9 | 18 |
| 5 | M - 11 | 8 |

EXAMPLE 2

A sand blasted aluminum plate is coated with 1.0 mil photoadhesive layer comprising:

| | | |
|---|---|---|
| (a) | unsaturated polyester resin obtained by the styrene evaporation of "Polylite TDR-1131R" Dainippon Ink Kagaku Ltd. (Condensation product of bisphenol A, propylene oxide and maleic anhydride) | 65 weight % |
| (b) | monomer | 30 weight % |
| (c) | benzoin methyl ether | 5 weight % |

The surface of the photoadhesive layer is overcoated with the silicone gum solution, dried and cured as described in Example 1.

Over the silicone rubber surface thus applied, a protecting film is laminated and the resulting plate is exposed to light through a positive transparency for an adequate number of minutes. Following the exposure, the protecting film is pealed off.

Then the exposed plate is developed with n-heptane developer, dried, mounted on the press and inked, as described in Example 1.

The adequate exposure times for each plate having various photoadhesive compositions are shown in Table 2 below.

Table 2

| Experiment Numbers | Monomers | Adequate Exposure Times (min.) |
|---|---|---|
| 6 | M - 1 | 20 |
| 7 | 2 | 3 - 5 |
| 8 | 3 | 8 |
| 9 | 4 | 25 |
| 10 | 5 | 3 |
| 11 | 6 | 2 |
| 12 | 7 | 9 |
| 13 | 8 | 8 |
| 14 | 9 | 4 |
| 15 | 10 | 8 |
| 16 | 11 | 8 |
| 17 | 12 | 30 |
| 18 | 13 | * > 30 |
| 19 | 14 | * > 30 |
| 20 | 15 | no image |

* difficult to remove the silicone layer in the image area.

EXAMPLE 3

A sand blasted aluminum plate is coated with a 1.0 mil photoadhesive layer comprising:

| | | |
|---|---|---|
| (a) | "Gosenil E50(Y8)" Nippon Gosei Kagaku Ltd. polyvinyl acetate Pn = 1400) | 65 weight % |
| (b) | monomer | 30 weight % |
| (c) | benzoin methyl ether | 5 weight % |

Then the silicone rubber layer and protecting film are applied and the plate is exposed to light. The protecting film is then peeled off. The plate is then developed and inked in the same way as described in Example 1.

The adequate exposure times for each plate are shown in Table 3 below.

Table 3

| Experiment Numbers | Monomers | Adequate Exposure Times (min.) |
|---|---|---|
| 21 | M - 1 | > 30 |
| 22 | 2 | 5 |
| 23 | 3 | > 30 |
| 24 | 4 | 30 |
| 25 | 5 | 3 |
| 26 | 6 | 3 |
| 27 | 7 | 30 |
| 28 | 8 | 30 |
| 29 | 9 | 15 |
| 30 | 10 | > 30 |
| 31 | 11 | 8 |
| 32 | 12 | > 30 |
| 33 | 13 | * > 30 |
| 34 | 14 | * > 30 |
| 35 | 15 | no image |

* difficult to remove silicone layer in the image area.

EXAMPLE 4

A sand blasted aluminum plate is coated with a 1.0 mil photoadhesive layer comprising:

| | | |
|---|---|---|
| (a) | unsaturated polyester resin same as used in Example 2 | 65 weight % |
| (b) | addition product of glycidyl methacrylate xylylene diamine (4/1 mole ratio) | 30 weight % |
| (c) | initiator | 5 weight % |

Then the silicone rubber layer and protecting film are applied, and the plate exposed to light. The protecting film is then peeled. The plate is then developed and inked, same as described in Example 1.

The adequate exposure times for each plate are shown in Table 4.

Table 4

| Experiment Numbers | Initiator | Adequate Exposure Times (min.) |
|---|---|---|
| 36 | IN - 1 | 4 |
| 37 | 2 | 4 |
| 38 | 3 | 4 |
| 39 | 4 | 15 |
| 40 | 5 | 18 |
| 41 | 6 | 30 |
| 42 | 7 | 3 |
| 43 | 8 | 2 |
| 44 | 9 | 15 |
| 45 | 10 | 15 |
| 46 | 11 | 18 |
| 47 | 12 | 15 |
| 48 | 13 | 20 |
| 49 | 14 | 30 |
| 50 | 15 | 8 |

EXAMPLE 5

A sand blasted aluminum plate is coated with a 1.0 mil photoadhesive layer comprising

| | | |
|---|---|---|
| (a) | polymer binder | 65 weight % |
| (b) | glycidyl methacrylate derivative same as used in Example 4 | 30 weight % |
| (c) | benzoin methyl ether | 5 weight % |

Then the silicone rubber layer and protecting film are applied, and the plate exposed to light. The protecting film is peeled, and the plate developed and inked, same as described in Example 1.

The adequate exposure times for each plate are shown in Table 5 along with the polymer binder used.

Table 5

| Experiment Number | Polymer Binder | Adequate Exposure Times (min.) |
|---|---|---|
| 51 | P - 1 | 8 |
| 52 | 2 | 8 |
| 53 | 3 | 4 |
| 54 | 4 | 8 |
| 55 | 5 | 4 |
| 56 | 6 | 4 |
| 57 | 7 | 8 |
| 58 | 8 | 3 |
| 59 | 9 | > 30 |
| 60 | 10 | 2 |
| 61 | 11 | 2 |
| 62 | 12 | 2 |
| 63 | 13 | > 30 |

EXAMPLE 6

A 4 mils electrical discharge treated polyethylene terephthalate film (Toray "Lumirror") is coated with a 1.0 mil photoadhesive layer same as used in Example 4.

An adhesive coating solution is prepared by dissolving "Toray Silicone PRX-305" (an uncured, filled, single component silicone gum of linear diorganopolysiloxane having oxime endgroups at which crosslinking can be produced by the action of atmospheric moisture) in n-heptane at room temperature to yield approximately 7.5% solution by weight.

The surface of the photoadhesive layer is overcoated with the silicone gum solution, to provide a 0.2 mil cured silicone rubber layer after drying and being stored in moderate humidity for 24 hours at room temperature.

Over the silicone rubber surface thus applied, a 0.2 mil polypropylene film (Toray "Torayfan") is laminated by calendering rollers.

The plate thus prepared is exposed to light, developed and inked samely as described in Example 1.

The adequate exposure time for each plate are shown in Table 6.

Table 6

| Experiment Number | Photoinitiator | Adequate Exposure Time (min.) |
|---|---|---|
| 64 | IN - 1 | 10 |
| 65 | 3 | 6 |
| 66 | 4 | 20 |
| 67 | 6 | 15 |
| 68 | 9 | 15 |
| 69 | 11 | 10 |
| 70 | 12 | 7 |
| 71 | 15 | 10 |

EXAMPLE 7

A 10 mil colored steel foil (Nisshin Seiko Ltd.) is coated with a 1.0 mil photoadhesive layer same as used in Example 5.

Then the silicone rubber layer and protecting film are applied, exposed to light, developed and inked samely as described in Example 6.

The adequate exposure times for each plate are shown in Table 7.

Table 7

| Experiment Number | Polymer Binder | Adequate Exposure Time (min.) |
|---|---|---|
| 72 | P - 2 | 15 |
| 73 | 3 | 7 |
| 74 | 5 | 8 |
| 75 | 6 | 7 |
| 76 | 7 | 8 |
| 77 | 8 | 15 |
| 78 | 9 | 8 |
| 79 | 10 | 3 |

EXAMPLE 8

The presensitized plates obtained in Experiment Number 60, 61 are exposed to light from the same light source as used in Example 1, for 5 minutes through a positive transparency.

The protecting film being peeled off, the plate is developed with following liquids in the same way as described in Example 1.

The qualities of the resulting plates are summarized in Table 8.

Table 8

| Experiment Number | Plate used for development | Developing liquid* | Plate quality |
|---|---|---|---|
| 80 | Ex. No. - 60 | n-heptane/acetone | good |
| 81 | 60 | n-heptane/trichlene | good |
| 82 | 60 | n-heptane/ethyl acetate | good |
| 83 | 60 | n-heptane/ethyl alcohol | good |
| 84 | 61 | n-heptane/acetone | good |
| 85 | 61 | n-heptane/trichlene | good |
| 86 | 61 | n-heptane/ethyl acetate | good |
| 87 | 61 | n-heptane/ethyl alcohol | good |

*all 1/1 volume ratio

What is claimed is:

1. A positive acting presensitized dry planographic printing plate comprising:

a. a base layer having sufficient strength to withstand the stress normally encountered in a printing process;

b. a oleophilic photoadhesive layer secured to and overlying the said base layer, and containing an ethylenically unsaturated photopolymerizable monomer or oligomer having the property of polymerizing when exposed to actinic light;

c. a silicone rubber layer secured to and overlying the said photoadhesive layer, wherein selected portions of said photoadhesive layer, when polymerized by actinic light, are adherable locally to said overlying silicone rubber layer; and d. said silicone layer being composed of a material having the property of swelling in the presence of a swelling agent, wherein swollen non-adhered portions of said silicone rubber layer are readily removable to provide an ink-receptive surface in the image area; and wherein said removal may be accomplished by the action of a developing liquid having swelling properties and being capable of being absorbed by the said silicone rubber layer, and of causing swelling of said silicone layer, while the portions of the silicone rubber layer which are adhered to said photoadhesive layer remain securely adhered and provide an ink-repellent background area.

2. The positive acting presensitized plate of claim 1 wherein said silicone rubber layer comprises crosslinked diorganopolysiloxane obtained by curing silicone gums comprising diorganopolysiloxanes having the central repeating unit of $$\left[ - \overset{\displaystyle R}{\underset{\displaystyle R}{\overset{|}{\underset{|}{Si}}}} - O - \right]_n$$

wherein *n* is as small as 2 or as large as 20,000 or more, the ratio of R to Si in said compound being within the range 1.95 to 2.1, the R moieties being the same or not, each individual R being a group selected from the class consisting of hydrogen, vinyl, alkyl, aryl, halogenated vinyl, halogenated alkyl, halogenated aryl, and cyano alkyl, wherein more than 60% of said R groups are methyl groups.

3. The presensitized plate of claim 1 wherein: said photoadhesive layer comprises an ethylenically unsaturated photopolymerizable monomer or oligomer having a boiling point above 100°C, a photoinitiator, and, if necessary, an inhibitor of heat polymerization, polymeric materials or an inorganic powder.

4. The presensitized plate of claim 3 wherein said ethylenically unsaturated photopolymerizable monomer or oligomer comprises acrylic or methacrylic monomer or oligomer having a boiling point above 100°C being derived from monoalcohols or monoamines having less than 30 carbon atoms or polyalcohols or polyamines having less than 80 carbon atoms.

5. The presensitized plate of claim 4 wherein said acrylic or methacrylic monomer comprises dimethylaminoethyl methacrylate; (poly)ethyleneglycol dimethacrylate, 3-chloro-2-hydroxypropyl methacrylate, N,N,N',N'-tetrakis-2-hydroxy-3-methacryloyloxypropylxylylenediamine, N-methoxymethylacrylamide, or hydrxyacetoneacrylamide.

6. The presensitized plate of claim 3 wherein the photoinitiator is a member selected from the group consisting of benzophenone, p,p'dimethylaminobenzophenone, xanthone, benzoin, benzoin methyl ether, benzoin ethyl ether, benzoin isopropyl ether, dibenzyl disulfide, and uranyl nitrate.

7. The presensitized plate of claim 3 wherein the polymeric material is a member from the group consisting of unsaturated polyester resins composed of units selected from ethylene oxide, propylene oxide, phthalic acids, bisphenol A maleic anhydride and fumalic acid, polyvinyl acetate, ethylene-vinyl acetate copolymer, vinyl chloridevinyl acetate copolymer polyethyl(meth)acrylate, polybutyl(meth)acrylate, polyoctyl(meth)acrylate, polyethylene oxide, and soluble nylon copolymers.

8. The presensitized plate of claim 1 wherein said developing liquid comprises paraffinic hydrocarbons, or aromatic hydrocarbons having a distillation range 10°–300°C, as a major component.

9. A method of producing a positive acting presensitized dry planographic printing plate, said method comprising the steps of:

a. providing a base layer having sufficient strength to withstand the stress normally encountered in a printing process;
b. applying a photoadhesive layer overlying the said base layer, said photoadhesive layer being capable of polymerizing when exposed to actinic light;
c. applying a silicone rubber layer overlying the said photoadhesive layer;
d. exposing said photoadhesive layer to actinic light through a positive transparency having image and non-image areas and through said silicone rubber layer to polymerize the non-image areas of said photoadhesive layer and bind same to said overlying silicone rubber layer;
e. applying a developing liquid to said silicone rubber, said developing liquid being capable of being absorbed by the said silicone rubber layer and causing unique swelling of the image areas of said silicone rubber layer which have not been bound to said photoadhesive layer,
f. rubbing said silicone rubber layer with developing liquid to remove the image areas of silicone rubber layer not bound to said photoadhesive layer to provide an ink-receptive surface in the image areas while the non-image areas of the silicone rubber layer bound to the said photoadhesive layer provide ink repellent background area.

* * * * *